(12) United States Patent
Dumas et al.

(10) Patent No.: US 6,915,634 B2
(45) Date of Patent: Jul. 12, 2005

(54) SUPERCHARGER ARRANGEMENTS FOR ENGINE ASSEMBLIES

(75) Inventors: Eric Dumas, Houilles (FR); Pierre Gonzalez, Vilebon sur Yvette (FR); Pascal Hottebart, Eragny sur Oise (FR); Benjamin Lheriau, Le Chesnay (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 10/733,248

(22) Filed: Dec. 12, 2003

(65) Prior Publication Data

US 2004/0168441 A1 Sep. 2, 2004

(30) Foreign Application Priority Data

Dec. 12, 2002 (EP) .............................. 02293075

(51) Int. Cl.⁷ .......................... F02B 33/44; F02B 67/10; F01M 11/02
(52) U.S. Cl. ...................... 60/605.3; 60/605.1; 60/612; 184/6.11
(58) Field of Search .......................... 60/605.3, 605.1, 60/612; 184/6.11

(56) References Cited

U.S. PATENT DOCUMENTS

| | | | | |
|---|---|---|---|---|
| 3,203,514 A | * | 8/1965 | Davies et al. ............... | 60/605.1 |
| 3,396,532 A | * | 8/1968 | Munk ......................... | 60/605.1 |
| 4,474,007 A | * | 10/1984 | Kronogard et al. ......... | 60/605.1 |
| 4,583,367 A | | 4/1986 | Kapfer et al. ............... | 60/605.3 |
| 4,716,735 A | | 1/1988 | Ruf et al. ................... | 60/605.3 |
| 5,406,795 A | * | 4/1995 | Raub et al. ................. | 60/605.1 |
| 6,688,103 B2 | * | 2/2004 | Pleuss et al. ............... | 60/605.3 |

FOREIGN PATENT DOCUMENTS

| | | | | |
|---|---|---|---|---|
| DE | 101 22 406 | | 11/2002 | ........... F02B/37/00 |
| EP | 0 952 329 | | 10/1999 | ............. F02F/7/00 |
| EP | 1176301 A2 | * | 1/2002 | ............. F02F/7/00 |

* cited by examiner

*Primary Examiner*—Thai-Ba Trieu
(74) *Attorney, Agent, or Firm*—Oblon, Spivak, McClelland, Maier & Neustadt, P.C.

(57) ABSTRACT

A supercharger arrangement for an engine assembly 10 is disclosed, the arrangement including first and second superchargers 22A, 22B that are mounted on the engine assembly by means of separate first and second mounting members 46, 48 respectively. Each mounting member defines an integrated supercharger lubrication conduit 62A, 62B, 64A, 64B and the present invention is characterized in that the superchargers 22A, 22B are of substantially identical construction and are separable from the first and second mounting members 46, 48. The integrated lubrication conduits 62A, 62B, 64A, 64B are routed through their respective said mounting members in such a manner as to enable the first and second superchargers to be mounted on the engine assembly 10 in substantially mirror image orientations thereabout.

10 Claims, 9 Drawing Sheets

SUPERCHARGER ARRANGEMENTS FOR ENGINE ASSEMBLIES

The present application claims priority to Patent Doc. No. 02293075.4 filed in Europe on Dec. 12, 2002, the disclosure of which is expressly incorporated by reference herein.

FIELD OF THE INVENTION

The present invention relates to supercharger arrangements for engine assemblies and in particular to a supercharger arrangement for an engine equipped with a plurality of superchargers.

BACKGROUND TO THE INVENTION

It is known to provide an engine with one or more superchargers, which may be embodied in the form of exhaust driven turbochargers. Superchargers usually require a lubrication system and many such lubrication systems are closed circuits often using engine oil as a lubricant. The lubrication system usually includes an oil feed conduit and an oil return conduit. The oil feed supplies oil under pressure from an oil pump of the engine to the or each supercharger concerned and the oil return comprises a conduit adapted to drain the oil away towards a collection area such as an oil sump of the engine. Life expectancy of a turbocharger relies considerably on a steady flow of clean oil supplied to its bearings under pressure from the engine's lubrication system and on the free exit of that oil for its return back to the engine sump.

In U.S. Pat. No. 4,716,735, an exhaust gas driven turbocharger arrangement is proposed in which an engine mounting is integrated with a bearing housing of the turbocharger. Oil supply and return passages are defined through the mounting for use in lubrication of the turbocharger bearings. Such an arrangement requires a custom-made turbocharger in order to integrate its bearing housing with the engine mounting of a particular installation. Custom-made turbochargers may prove more expensive than using mass-produced items.

The arrangement proposed in U.S. Pat. No. 4,716,735 is best suited to use in engine assemblies having only one turbocharger and may not prove suitable for use in an arrangement calling for a plurality of turbochargers. For example, in a multi-cylinder engine having its cylinders arranged in banks in a 'V' or 'W' configuration, it may be desirable to provide a plurality of turbochargers.

Taking the example of a 'V' configured engine and attempting to fit a plurality of turbochargers according to U.S. Pat. No. 4,716,735 dedicated one to each bank, it will be found that a symmetrical set-up is not possible. In order to bolt a second example of the same component to the opposite side of the engine block, the whole turbocharger and integrated mounting assembly of that second example must be rotated 180°. One problem with such an arrangement is that the compressor and exhaust turbines of the opposing turbochargers will point towards opposite ends of the engine. This may lead to complex and less than ideal inlet and exhaust ducting. To reverse the orientation of the turbocharger would require an inverted casting for the bearing housing, resulting in a customized turbocharger on each side of the engine. Rather than reducing piece cost by doubling volume, such an arrangement might prove cost prohibitive as it would significantly increase the investment necessary in producing both right- and left-handed parts. In addition, it would necessitate precautions in parts delivery to the side of the production line, e.g. to ensure smooth delivery of the right parts to the assembly stations affected in equal volumes of each and to their appropriate sides of the line.

In U.S. Pat. No. 4,583,367 an arrangement is proposed for integration of a turbocharger arrangement with an engine mounting. This proposal deals with a single turbocharger and is concerned with defoaming and degassification of the oil being returned to the engine sump. Neither reversibility of the turbo installation between sides of the engine nor twin-turbochargers are considered. Reversing between sides or doubling up on turbochargers would suffer similar problems to those discussed in that respect for U.S. Pat. No. 4,716,735.

EP-1176301 proposes an engine crankcase that includes an integral turbocharger mounting. In similar fashion to U.S. Pat. No. 4,583,367, this document deals only with a single turbocharger and reversibility of the turbocharger installation between sides of the engine or twin-turbochargers are not considered. Reversing between sides or doubling up on turbochargers would suffer similar problems to those discussed in that respect for U.S. Pat. No. 4,716,735

EP-0952329 proposes a single and very complicated casting that acts as a one-piece integrated front-end for a large industrial engine. The use of such a one piece front end is expensive and is cost prohibitive for mass production. Such an arrangement also lacks flexibility in moving the position of the turbochargers around between variations in an engine range. The turbochargers can only be mounted high up on the engine and this makes the arrangement unsuitable for adaptation for use in a passenger vehicle due to the height restrictions inherent in under-hood installations.

DE-10122406 proposes a single carrier casing having two turbocharger mountings integrated into it and adapted to carry a pair of turbochargers. The casting is reversible in its mounting position in co-operation with a manifold arrangement. In similar fashion to EP-0952329, integration of both turbocharger mountings into the same casting largely limits use of this arrangement to mounting the turbochargers on top of the engine. That limits design flexibility and may impose height problems in some under-hood installations, notable for passenger vehicles.

There is therefore a continuing need to seek improved arrangements for mounting multiple superchargers to engines, in particular for use in installations for passenger vehicles.

SUMMARY OF THE INVENTION

It is an object of the present invention to provide improved supercharger arrangements for engine assemblies and in particular to provide an improved arrangement for an engine equipped with a plurality of superchargers.

Accordingly, the present invention provides a supercharger arrangement for an engine assembly, the arrangement including first and second superchargers that are mounted on said engine assembly by means of individual first and second mounting members respectively, each said mounting member defining therethrough a supercharger lubrication conduit, wherein said superchargers are of substantially identical construction and are separable from said first and second mounting members and said lubrication conduits are routed through their respective said mounting members in such a manner that said first and second superchargers are mounted on said engine assembly in substantially mirror image orientations thereabout.

Among the advantages of the present invention is the provision of a low cost arrangement for using a plurality of substantially identical superchargers on the same engine while achieving substantially mirror image orientations of those units around the engine. This saves costs by raising the volumes of an expensive part of a supercharging arrangement, the supercharger itself, rather than necessitating several different and possibly custom units. Using individual mountings increases flexibility in under-hood installations and the arrangement is not limited to mounting the superchargers on top of the engine.

Said mounting members may be disposed on opposite sides of a crankcase of said engine assembly and said lubrication conduits may connect said superchargers to an engine lubrication circuit through the sides of said crankcase.

Said lubrication conduits may each comprise a lubricant feed passage and a lubricant return passage and the routing of at least part of said feed and return passages may be inverted between said mounting members.

Inversion of said feed and return passages may take operative effect at respective supercharger mounting faces of said first and second supercharger mounting members.

When said superchargers are mounted on said engine assembly, at least one of corresponding pairs of charge air entries, charge air exits, exhaust gas entries or exhaust gas exits of said superchargers may be disposed at substantially the same orientation as each other with respect to said engine assembly.

At least one said mounting member may comprise a casting or a molding and is a component that is separable from both its associated said supercharger and from the rest of said engine assembly.

The present invention also provides an engine assembly including first and second superchargers mounted thereto on individual first and second supercharger mounting members respectively, each said mounting member having integrated therewith a lubrication feed passage and a lubrication return passage, wherein said superchargers are separable from their associated said mounting members and the routing of said feed and return passages is substantially inverted between said mounting members in the region of respective supercharger mounting faces thereof in such a manner that said superchargers are mountable interchangeably between said first and second mounting members with substantially mirror image orientations and regardless of which said supercharger is mounted to which said mounting member.

Said engine assembly may comprise a multi-bank engine having a crankcase and defining a plurality of cylinders that are disposed in banks at an angle with respect to each other, said first and second mounting members being disposed on opposite sides of said crankcase and said first and second superchargers being associated with different said banks of said engine assembly.

The present invention also provides a set of supercharger mounting members for use in a supercharger arrangement of an engine assembly, said mounting members comprising individual components and each individual said supercharger mounting member defining therethrough a supercharger lubrication feed passage and a supercharger lubrication return passage and end portions of said feed and return passages being substantially inverted between a pair of mounting members in the region of supercharger mounting faces thereof, whereby said mounting members are mountable to substantially opposing sides of a said engine assembly so that substantially identical superchargers are mountable one each to said mounting faces and are thereby disposed in substantially mirror image orientations about said engine assembly.

The present invention also provides a method of mounting a plurality of superchargers on an engine assembly, the method including;

a) providing on substantially opposing sides of said engine assembly individual first and second supercharger mountings, each of which mountings has defined therethrough a lubrication feed passage and a lubrication return passage whose routing is substantially inverted between said mounting members in the region of respective supercharger mounting faces thereof; and b) connecting first and second substantially identical superchargers to said first and second mountings respectively in substantially mirror image orientations about said engine assembly.

BRIEF DESCRIPTION OF THE DRAWINGS

The present invention will now be described by way of example only and with reference to the accompanying drawings, in which.

DETAILED DESCRIPTION OF THE INVENTION

Referring to the drawings, a preferred embodiment of a supercharger arrangement is disclosed for an engine assembly 10. The engine 10 includes a cylinder crankcase 12, preferably in the form of a multi-bank engine block in which a plurality of cylinders (e.g. four, six, eight, ten or twelve)

are connected to the crankcase 12 and are disposed in banks at an angle with respect to each other (e.g. a "V"). For the sake of example, the engine 10 of this embodiment may be considered as a V-6 engine fitted in use into an engine bay defined in a front portion of a vehicle and the engine 10 being disposed transverse to a centerline of the vehicle.

For convenience and in keeping with an exemplary but non-limiting transverse installation of a V-engine, the opposing banks of the engine 10 will be referred to as its front bank 14 and its rear bank 16. The banks of cylinders 14, 16 of the engine 10 are associated with respective front and rear cylinder heads 18, 20. It will be appreciated, however, that the present invention is not limited to only transverse installations and may be suitable for embodiment in the form of longitudinal, middle or rear mounted installations or in installations other than vehicles (e.g. generators or marine use).

The engine 10 is provided with a plurality of superchargers in the form of exhaust-gas driven variable geometry turbochargers 22A, 22B, each of which is assembled in association with an actuator 24 and are associated one each with the front bank 14 and the rear bank 16. In a variable geometry turbocharger, a valve is provided in the turbocharger casing. The valve is controlled by the actuator 24 and is used to vary the attack angle of exhaust gases driving the exhaust turbine so as to control its speed. For example, at low engine speeds the exhaust gas can provide only a low driving force to the exhaust turbine. The valve is then moved towards a closed position so as to increase the gas speed and thereby keep exhaust turbine speed up, even for low gas flows. On the other hand, at high engine speeds the valve is moved towards an open position so as to keep down the driving force. Such turbochargers may, therefore, be controlled to operate within a tight speed range. The present invention is not limited to only variable geometry turbochargers 22A, 22B and these may be replaceable by other types or equivalents such as waste-gate actuated turbochargers.

The turbochargers 22A, 22B are of substantially identical construction and each comprises an exhaust turbine portion 28 and a compressor portion 26. The exhaust turbine portion 28 includes an exhaust gas entry 30, an exhaust gas turbine and an exhaust gas exit 32 and the compressor portion 26 includes a charge air entry 34, a charge air compressor and a charge air exit 36. The exhaust turbine and compressor turbine are drivingly joined by means of a turbine shaft 38 that is supported on a turbine bearing arrangement 40. The turbine bearing arrangement 40 is lubricated by a lubricant, e.g. in the form of engine oil that is supplied under pressure by an engine oil pump and then drained back to a lubricant reservoir such as an engine pump.

The turbochargers 22A, 22B are mounted to the engine 10 one on each side of the crankcase 12 by means of a pair of individual mounting members protruding outwardly from substantially opposing sides of the crankcase 12, referred to for convenience as the turbocharger front mounting 46 and rear mounting 48. One or more of the individual front and rear turbocharger mountings 46, 48 may be integrated with the crankcase 12, whilst still being separate from each other and from the turbochargers. For ease of manufacture of the mountings 46, 48, however, it may be found preferable to produce them as separate components, separated from the crankcase 12 as well as from the turbochargers 22A, 22B and mountable to the crankcase 12. Such an individual and separate construction is the form illustrated by way of example in the present embodiment.

Each turbocharger 22A, 22B communicates with exhaust ports of at least its directly associated cylinder head 18, 20 via a connection 42 between its exhaust gas entry 30 and an exhaust arrangement 44 that includes one or more of header pipes and an exhaust manifold.

In the present embodiment, the individual turbocharger mountings 46, 48 each comprise a separate one-piece casting or molding having a back plate 50A, 50B and a support arm 52A, 52B extending away from the back plate. As illustrated with particular reference for the moment to FIGS. 5 to 10, one or both of the back plates 50A, 50B may be essentially triangular and planar in form and may be canted to one side, i.e. towards one end of the crankcase 12. In the arrangement of the present embodiment, the back plates 50A, 50B each have a base portion 54 with a mounting hole 56 defined therethrough at each end and a raised peak 58 defining an upper mounting hole 56. For substantial symmetry or mirror image, in use the raised peaks 58 are canted towards the same end of the engine assembly 10 while the support arms 52A, 52B each extend outwardly from a position substantially centralized with respect to the base mounting holes 56.

The mountings 46, 48 each have an integral lubrication conduit in the form of a lubricant feed passage 62A, 62B and a lubricant return passage 64A, 64B. The lubricant feed 62A, 62B and return 64A, 64B passages may be in the form of ducting defined through the support arms 52A, 52B and the back plates 50A, 50B, e.g. formed in the casting/molding process. These lubricant passages 62A, 62B, 64A, 64B are adapted to connect respective front and rear lubricant supply 68A, 68B and return 70A, 70B ports of the crankcase 12 to turbochargers 22A, 22B mounted in use on turbocharger mounting faces 72A, 72B, e.g. via mechanical fixings such as bolts screwed through a turbocharger-mounting flange and into mounting holes 60 defined in predetermined positions on the mounting faces. The positioning of the mounting holes 60 positions the turbochargers 22A, 22B in a predetermined orientation about the engine 10, e.g. along, towards or away from the cylinder crankcase 12.

It will be noted that the lubricant return passages 64A, 64B and crankcase return ports 70A, 70B are of a larger cross-sectional area that the lubricant feed ports 68A, 68B and lubricant feed passages 62A, 62B. This is because in the present embodiment the lubricant is supplied in the form of engine oil under pressure from an engine oil pump and under such circumstances the lubricant return passages 64A, 64B and crankcase return ports 70A, 70B are preferably be wider to accommodate gas bubbles in the spent oil returning to the engine sump.

In use, the lubricant feed and return passages 62A, 62B, 64A, 64B interface with lubricant inlets 74 and lubricant outlets 76 of the turbochargers 22A, 22B at the mounting faces 72A, 72B of the support arms 52A, 52B. The lubricant feed and return passages 62A, 62B, 64A, 64B are routed through their respective turbocharger mountings 46, 48 in such a manner as to enable the turbochargers 22A, 22B to be mounted on the engine 10 via the super-charger mounting holes 60 in substantially mirror image orientations thereabout.

In such a mirror image disposition, the turbochargers 22A, 22B can be mounted with at least one of their corresponding pairs of charge air entries 34, charge air exits 36, exhaust gas entries 30 or exhaust gas exits 32 being disposed at substantially the same orientation with respect to the engine 10. For example, the charge air entries 34 and exhaust gas exits 32 of the turbochargers 22A, 22B of each cylinder bank 14, 16 may be aligned substantially parallel with a centerline C/L running longitudinally through the cylinder crankcase 12. Such a situation is illustrated in the present embodiment and may be found useful in design of an associated air intake system or exhaust piping. Similar considerations may be applied to the charge-air exits 36 and/or the exhaust gas entries 30.

The lubricant supply ports 68A, 68B and return ports 70A, 70B may be positioned symmetrically on opposing sides of the cylinder crankcase 12. This means that if identical supercharger mountings were to be used on either side of the cylinder crankcase 12, the turbochargers 22A, 22B would point in opposite directions between opposing side of the engine 10. In order to compensate for this and to allow the use of substantially identical turbochargers 22A, 22B oriented in mirror image, e.g. pointing in substantially the same direction, the lubricant feed passages 62A, 62B and lubricant return passages 64A, 64B are operatively inverted between the mountings 46, 48.

The inversion preferably takes place in a cross-over region 66 of one mounting, shown by way of example as inside the rear bank mounting 48 and visible schematically with particular reference to FIGS. 1 to 4. Crankcase symmetry may be maintained between its lubricant supply and return ports 68A, 68B, 70A, 70B as illustrated schematically in FIG. 2, but this may not prove practical for mass production. What is necessary, however, is for substantial inversion of the lubricant feed and return passages 62A, 62B, 64A, 64B to take operative effect at the turbocharger mounting faces 72A, 72B. For example, in the embodiment illustrated the lubricant return passage 64A of the front mounting 46 is inboard of its associated lubricant feed passage 62A. The lubricant return passage 64B of the rear mounting 48 is therefore outboard of its associated lubricant feed passage 62B such that inversion has taken place.

While the inversion has be described in relation to implementation inside the rear mounting 48, the invention is not limited to this embodiment. The disposition of the lubricant feed and return passages 62A, 62B, 64A, 64B will usually depend on the disposition of the lubricant inlets 74 and outlets 76 of the turbochargers 22A, 22B, whose disposition on the mountings 46, 48 will depend in turn on which direction about the engine 10 the turbochargers 22A, 22B need to face and the positioning of their mounting holes 60.

To achieve the inversion through practical mountings 46, 48, it may be found easier to implement an off-set relationship between the lubricant feed and return passages 62B, 64B at their interface with the cylinder crankcase 12. An example may be seen with particular reference to the views of FIGS. 6 and 8. In the rear face 80 (i.e. crankcase interface side) of the front mounting 46, the lubricant feed and return passages 62A, 64A are side-by-side with the mounting 46 in its in-use position. In the rear face 82 of the rear mounting 46, the lubricant feed passage 62B is offset upwards from the lubricant return passage 64B. This arrangement may ease manufacture of the mounting 48 that includes the internal crossover between the lubricant feed and return passages 62B, 64B, e.g. by keeping down the number of drilling operations used. For either mounting 46, 48, so as to reach its destination on the turbocharger mounting face 72A, 72B, the lubricant feed passage 62A, 62B may pass through one or more portions of their associated mounting 46, 48 that also acts as a fillet 78.

Figure 1:
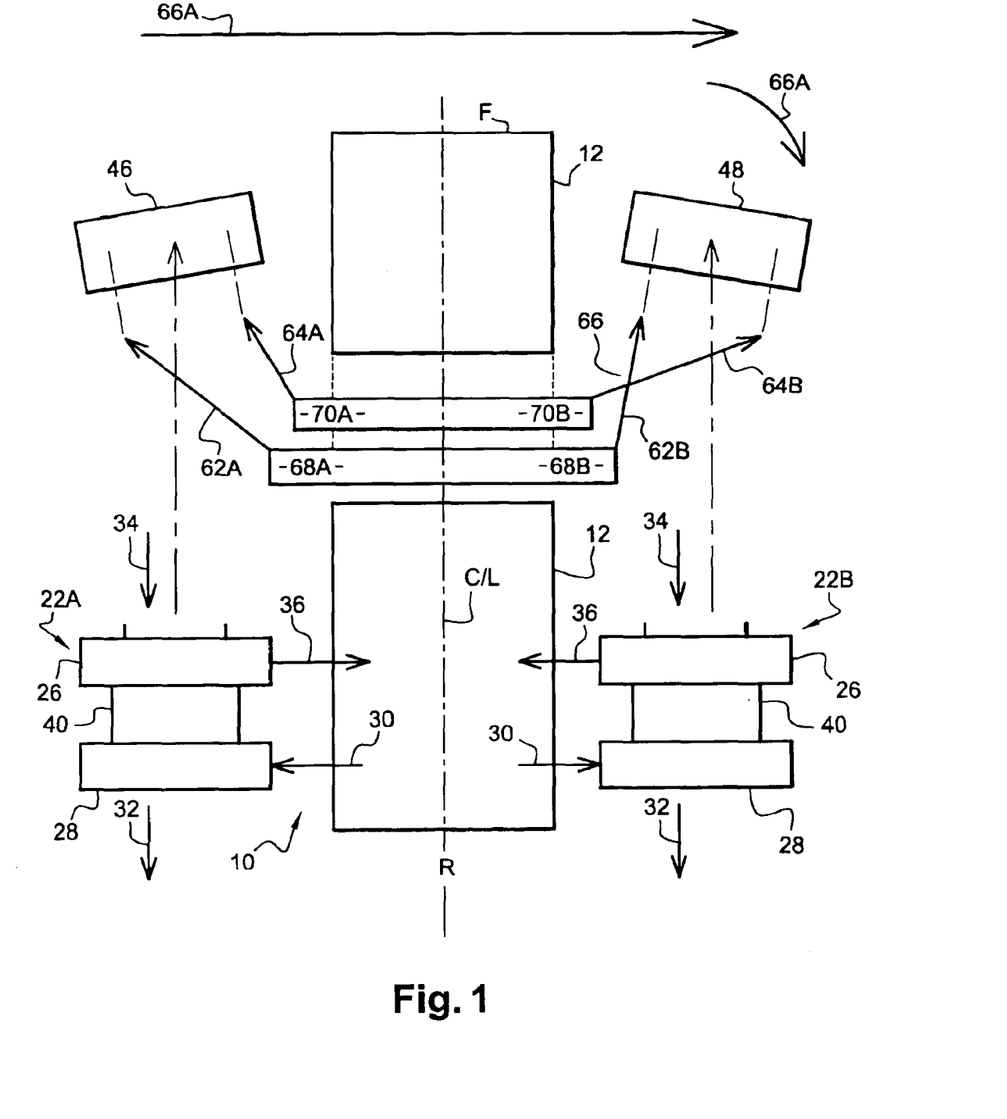
FIG. 1 is a schematic diagram of an engine assembly incorporating an arrangement according to the present invention.

The invention will now be considered for the moment with particular reference to the schematic diagram of FIG. 1. Symmetry across opposing sides of the cylinder crankcase 12 is preferably maintained for the lubricant supply passages 68A, 68B and return passages 70A, 70B, inversion 66 being effected through one of the mountings 48 so that feed and return passages 62A, 62B, 64A, 64B at the interface 72A, 72B, between the mountings 46,48 and the turbochargers 22A, 22B are functionally swapped over between sides of the engine 10 in accordance with the inversion arrows 66A. The arrangement therefore facilitates a method of mounting a pair of substantially identical turbochargers 22A, 22B to opposite sides of an engine 10 in mirror orientation, e.g. so that an axis through equal parts of each of those turbochargers 22A, 22B is disposed at substantially the same orientation as each other about the rest of the engine 10.

Figure 2:
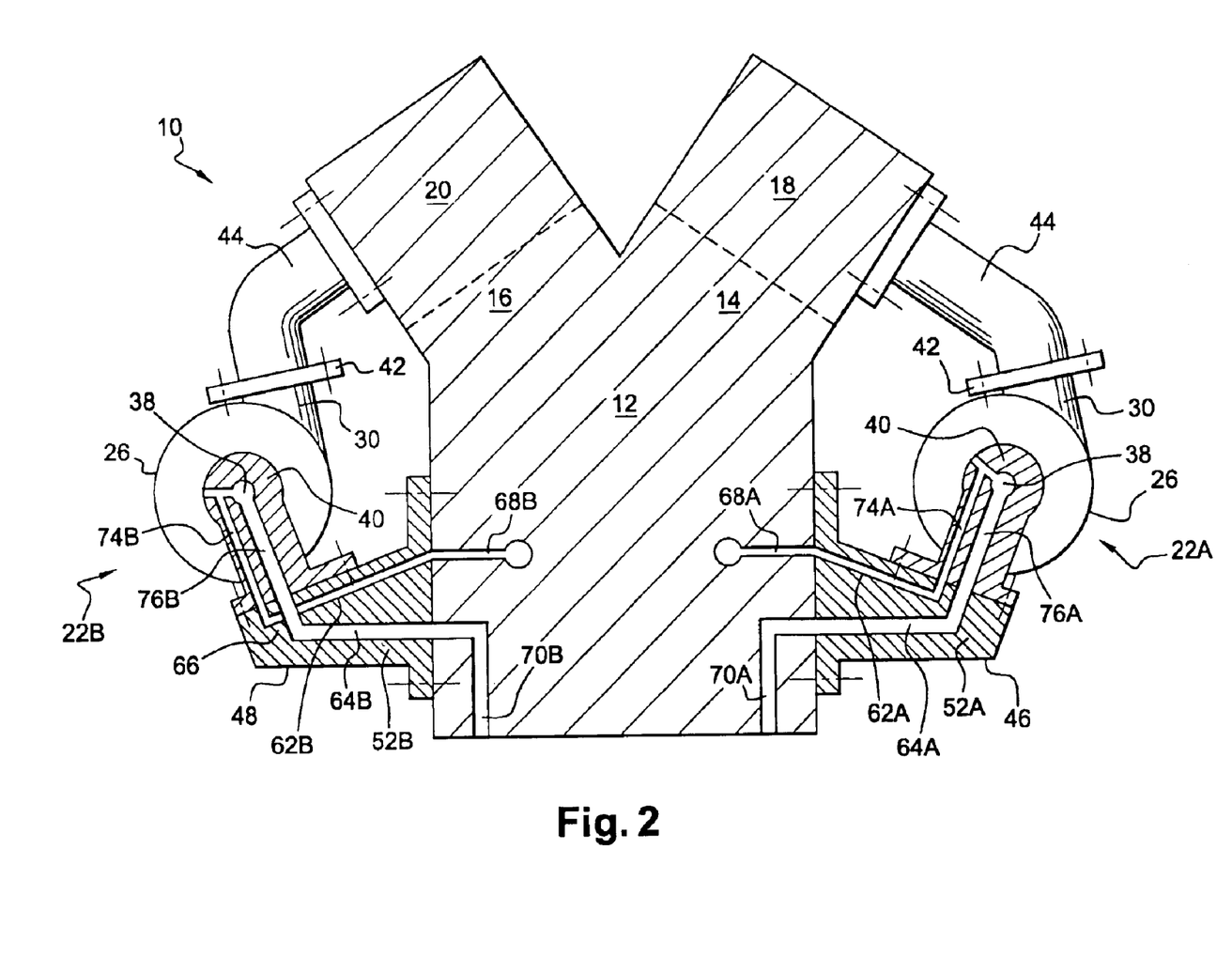
FIG. 2 is a schematic representation of a section through an engine assembly incorporating an embodiment of the arrangement of FIG. 1.
Figure 3:
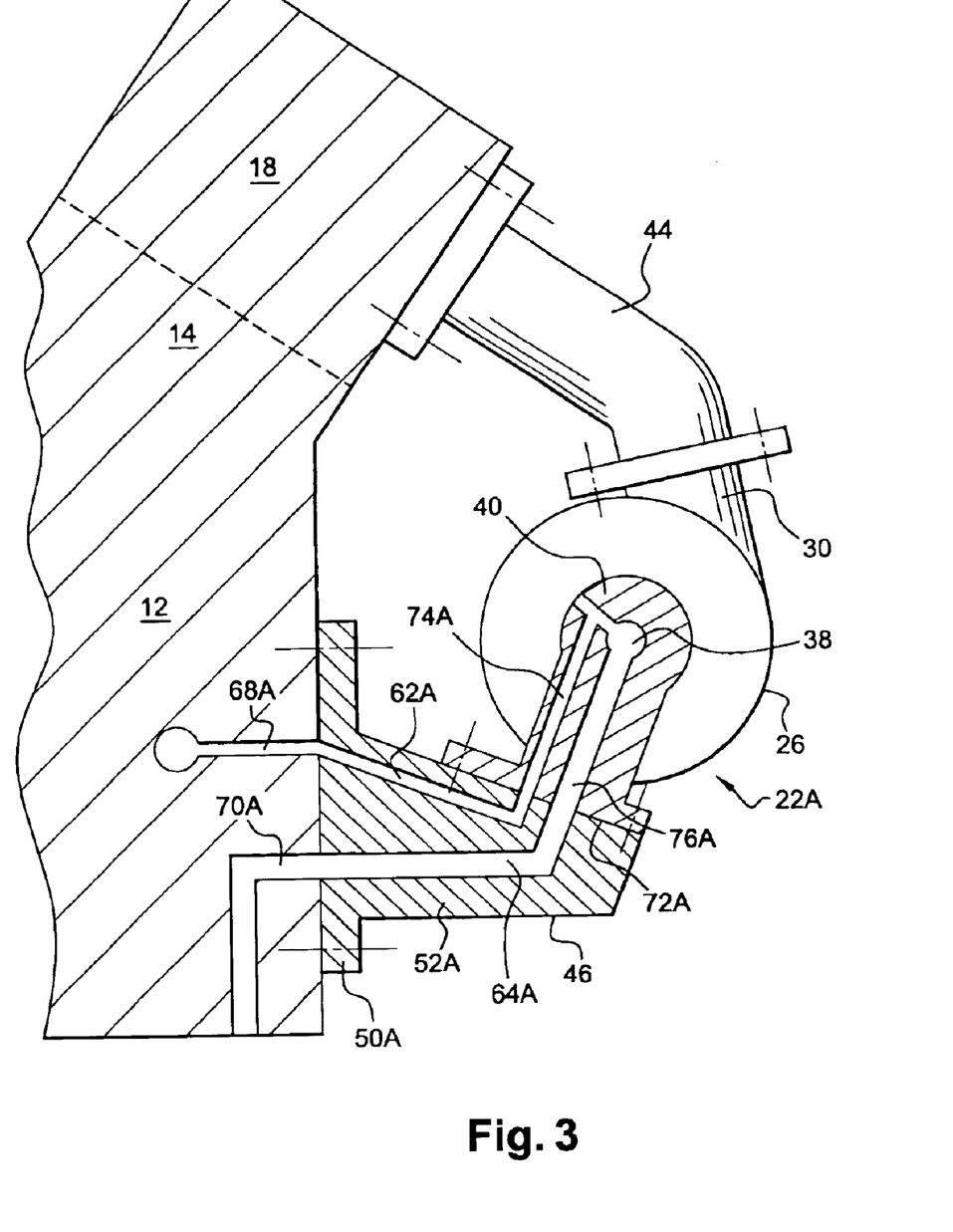
FIG. 3 is a close-up view of a first portion of FIG. 2.
Figure 4:
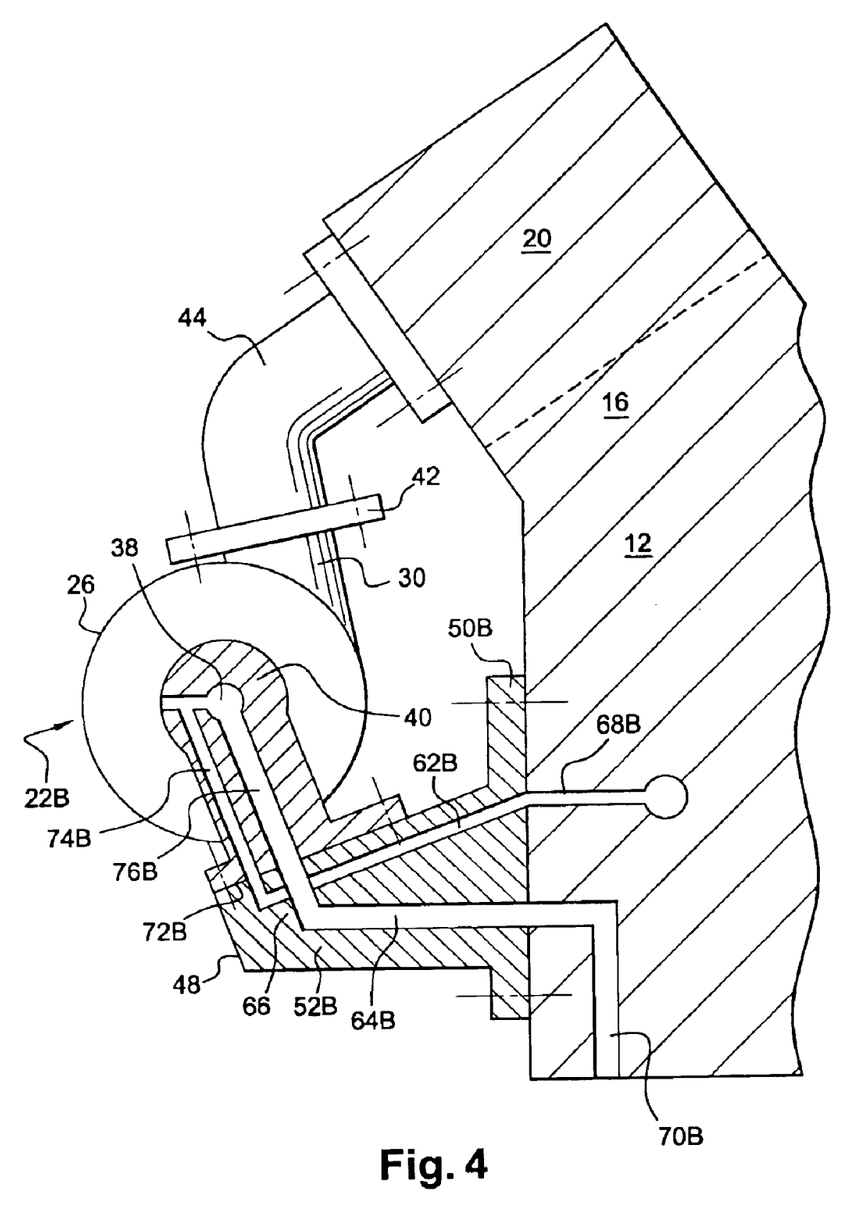
FIG. 4 is a close-up view of a second portion of FIG. 2.
Figure 5:
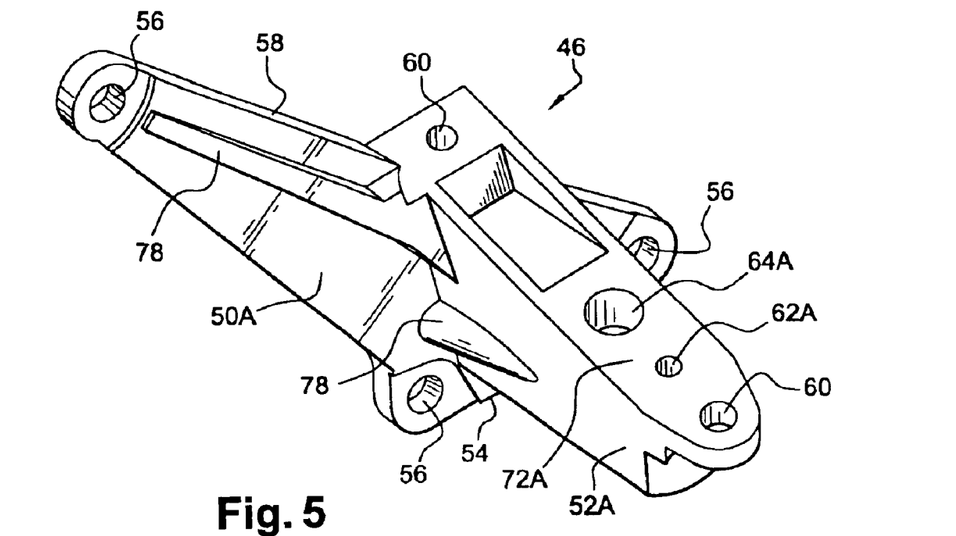
FIG. 5 is a perspective front view of a component of a practical embodiment of the arrangement of FIGS. 1 to 4.
Figure 6:
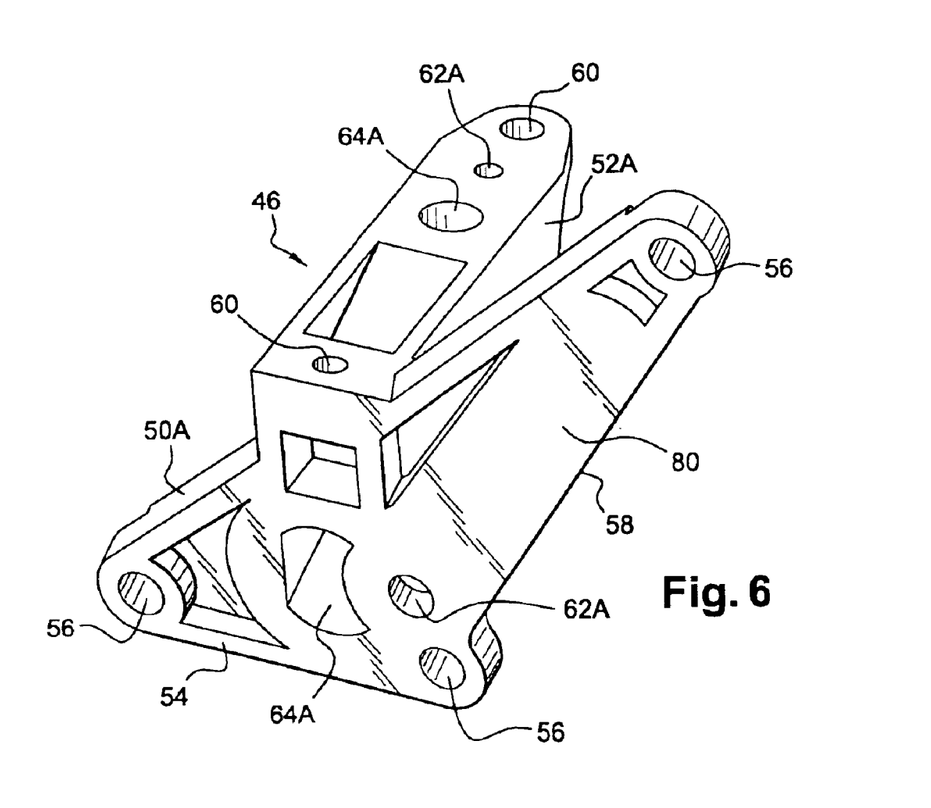
FIG. 6 is a perspective rear view of the component of FIG. 5.
Figure 7:
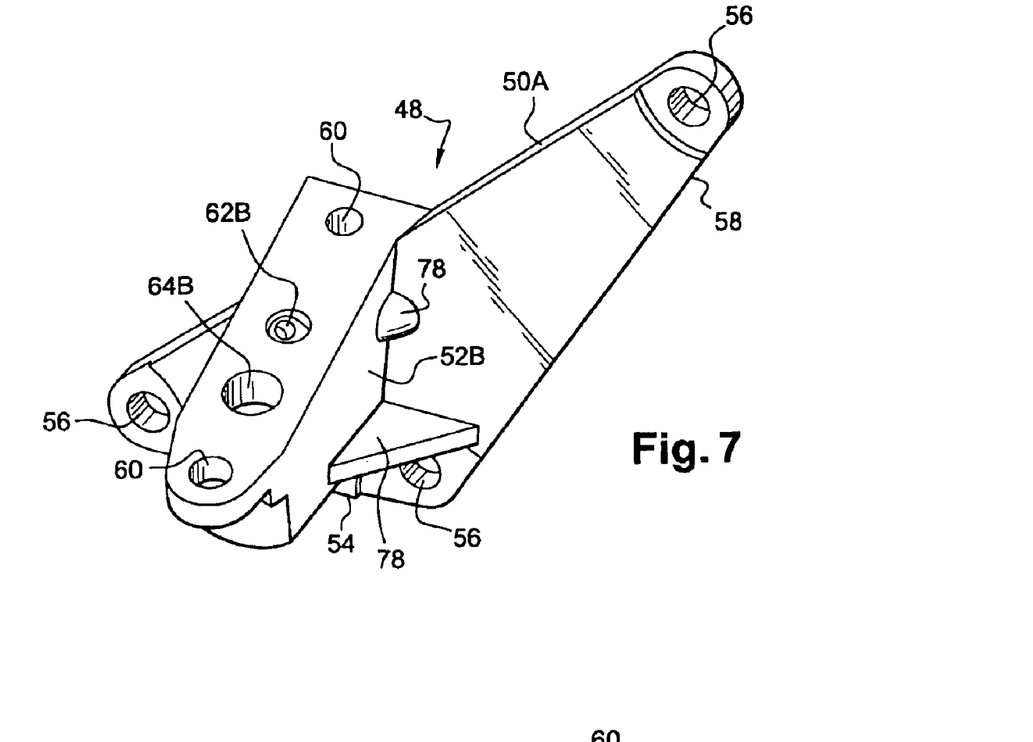
FIG. 7 is a perspective front view of a further component of a practical embodiment of the arrangement of FIGS. 1 to 4.
Figure 8:
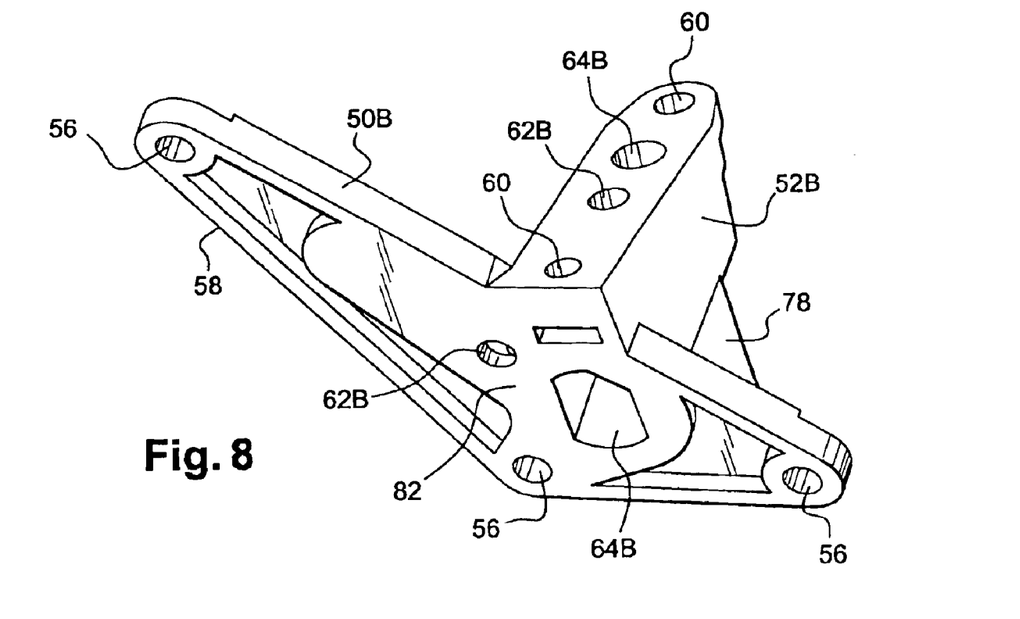
FIG. 8 is a perspective rear view of the component of FIG. 7.
Figure 9:
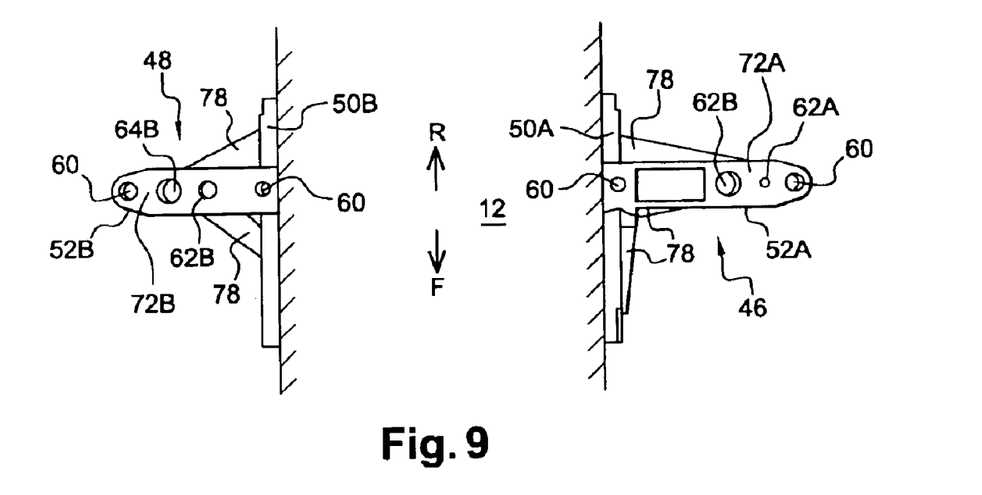
FIG. 9 is a plan view of the disposition of the components of FIGS. 5 to 8 in an installed position, shown with respect to a possible but non-limiting installation in which the front of the engine assembly is marked "F"
Figure 10:
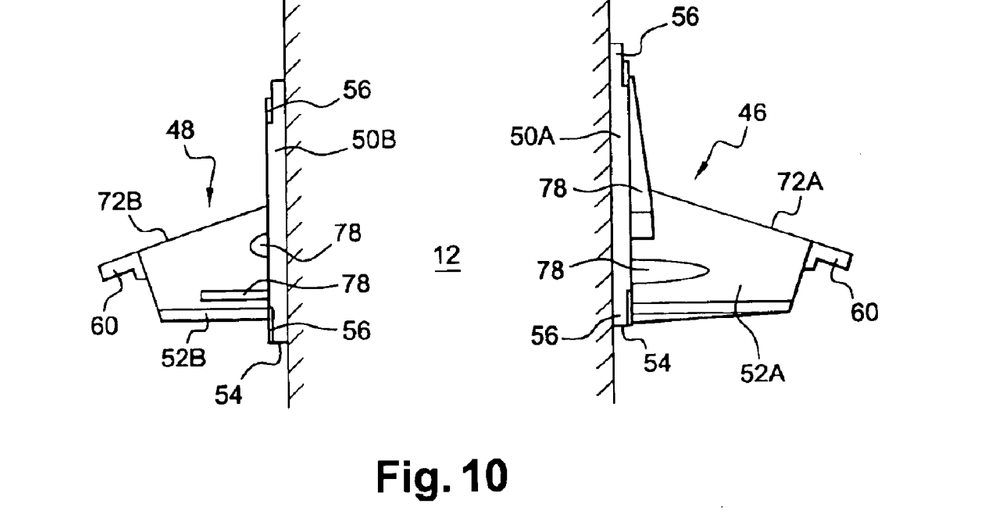
FIG. 10 is an end view of the arrangement of FIG. 9, viewed from one end (e.g. a front end "F") of the engine assembly.
Figure 11:
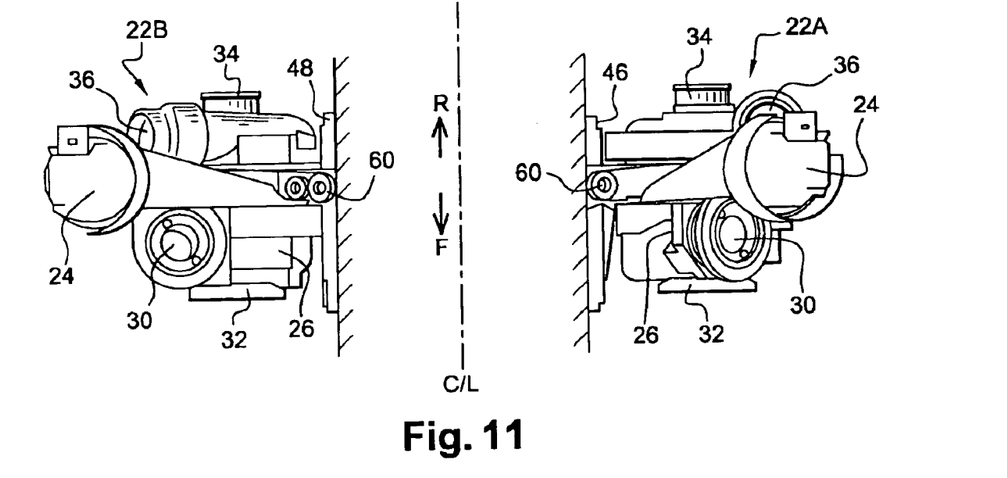
FIG. 11 is the plan view of FIG. 9 having a supercharger mounted onto each of the components of FIGS. 5 to 8.

Referring for the moment in particular to FIGS. 2 to 4, it can be seen that use of identical turbochargers 22A, 22B in substantially mirror image orientations about the engine 10 may offset certain parts of the turbochargers 22A, 22B towards or away from the engine. For example, in FIGS. 2 to 4 it can be seen that the exhaust gas entry 30 of the front bank turbocharger 22A is offset away from the engine 10, whereas the exhaust gas entry 30 of the rear bank turbocharger 22B is offset towards the engine 10. This situation may effect the design of the exhaust arrangement 44 supplying the turbochargers 22A, 22B, e.g. with respect to primary tract length or routing.

In addition, packaging concerns may make it necessary to position one of the turbochargers 22A at a different spacing from the cylinder crankcase 12 than the other 22B. Such a situation is illustrated by way of example and the front bank turbocharger 22A is spaced away from the cylinder crankcase 12 by more than the rear bank turbocharger 22B. Although the spacing away from the cylinder crankcase 12 is different, the turbochargers 22A, 22B are still orientated in substantially mirror fashion about the engine 10, with both their charge air entries 34 and exhaust gas exits 32 oriented in substantially the same way, e.g. with respect to a centerline C/L running through the cylinder crankcase 12 the turbine shaft 38 of each turbocharger 22A, 22B runs substantially parallel to that centerline C/L with corresponding parts 32, 34 pointing in the same direction front F or rear R of the engine 10.

The spacing, alignment and inclination of the turbochargers 22A, 22B with respect to the cylinder crankcase 12 is defined by the dimensions, angles and turbocharger fixing points as defined by the mounting holes 60 of the arms 52A, 52B. By way of example, the arm 52A of the front mounting 46 extends further out from its back plate 50A than does the arm 52B of the rear mounting 48 from its back plate 50B. This positions the front bank turbocharger 22A further away from the cylinder crankcase 12 than is positioned the rear bank turbocharger 22B by its mounting 48. The dimensions of fillets 78 and/or other strengthening features may vary between mountings 46, 48, e.g. in dependence on their individual packaging or load requirements.

Figure 12:
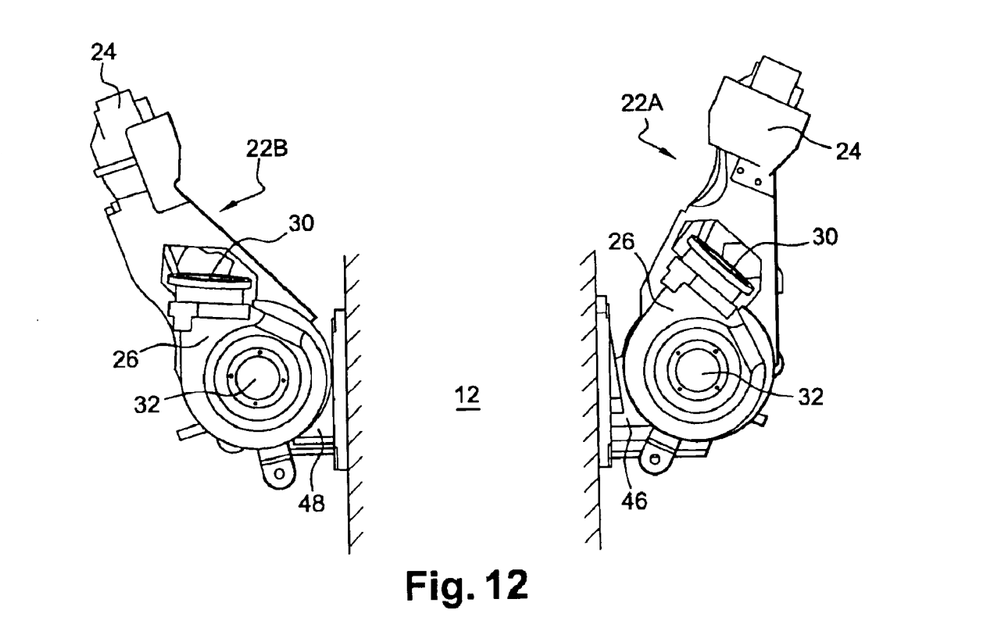
FIG. 12 is the view of FIG. 10 having a supercharger mounted onto each of the components of FIGS. 5 to 8.
Figure 13:
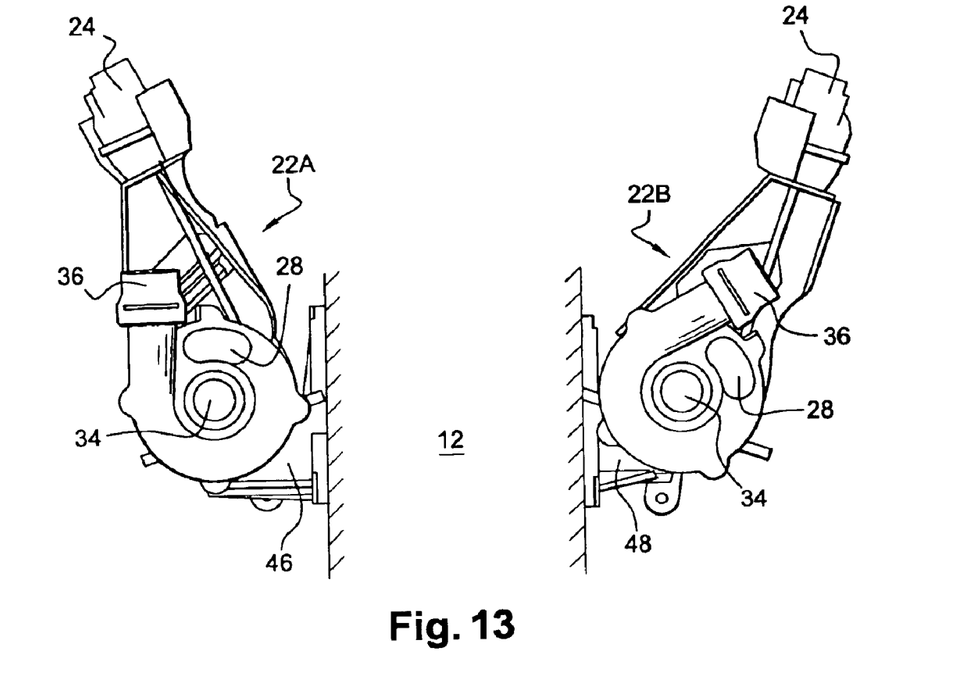
FIG. 13 is the view of FIG. 12 seen from the opposite end (e.g. a rear end "R") of the engine assembly.
Figure 14:
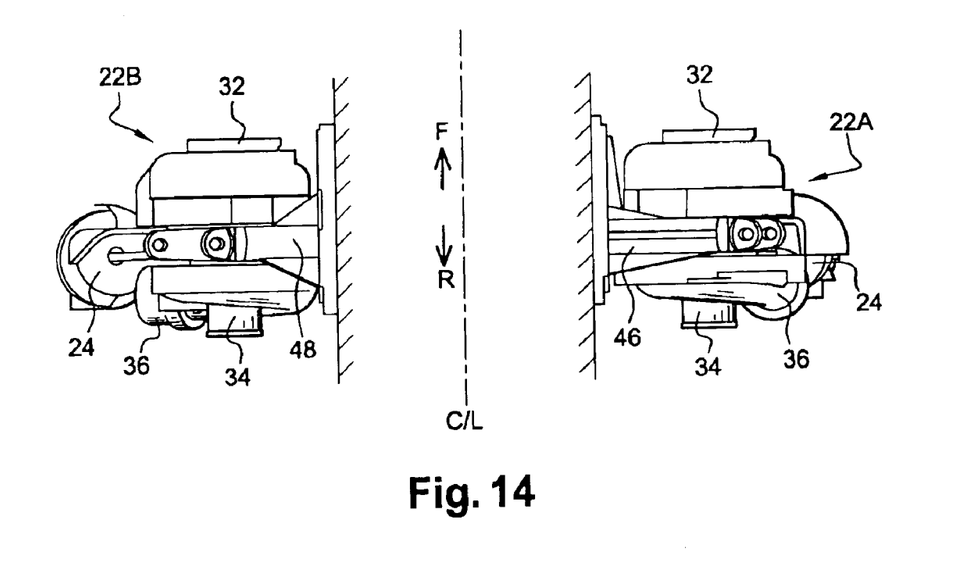
FIG. 14 is a bottom view of the arrangement of FIGS. 11 to 13.

Referring for the moment in particular to FIGS. 12 and 13, it can be seen that in the illustrated embodiment the corresponding charge air exits 36 and exhaust gas entries 30 do not necessarily line up with each other. This may be the case even though their corresponding charge air entries 34 and exhaust gas exits 32 are in substantially even orientation with respect to the cylinder crankcase 12. Whether or not more than one pair or set of corresponding orifices 30, 32, 34, 36 between the turbochargers 22A, 22B will be aligned once they are in a practical installation, may depend on the particular model of turbocharger used.

Among the advantages of the invention is the provision of a low cost arrangement for using a plurality of substantially identical turbo chargers on the same engine while achieving substantially mirror image orientations of those units around the engine. This saves costs by raising the volumes of the expensive part of a turbo-charging arrangement, the turbocharger itself, rather than necessitating several different and possibly custom units. The piece price of individual custom mountings being, of course, much lower than that of custom turbochargers. Furthermore, the arrangement may provide greater supplier choice as standard or off-the-shelf units may be employed. The arrangement also helps achieve optimum packaging and design for inlet and exhaust systems by aligning two or more entries or exits of the turbochargers in substantially the same direction. Changes in design between variants of an engine family or installation may also be accommodated by design changes to only the separate mountings, whose tooling and development costs are not high.

The mounting being separate can be mounted with greater flexibility than in installations that propose a one-piece mounting for twin superchargers, e.g. lower down which save height in under-hood. This is particularly advantageous where the engine assembly concerned is to be used in a passenger vehicle or light truck where hood height is an important design constraint.

While the present invention has been particularly shown and described with respect to a preferred embodiment, it will be understood by those skilled in the art that changes in form and detail may be made without departing from the scope and spirit of the invention.

What we claim is:

1. A method of mounting a plurality of superchargers on an engine assembly, the method including;
   a) providing on substantially opposing sides of said engine assembly individual first and second supercharger mountings, each of which mountings has defined therethrough a lubrication feed passage and a lubrication return passage whose routing is substantially inverted between said mounting members in the region of respective supercharger mounting faces thereof; and
   b) connecting first and second substantially identical superchargers to said first and second mountings respectively in substantially mirror image orientations about said engine assembly.

2. A supercharger arrangement for an engine assembly, the arrangement including first and second superchargers that are mounted on said engine assembly by means of individual first and second mounting members respectively, each said mounting member defining therethrough a supercharger lubrication conduit, wherein said superchargers are of substantially identical construction and are separable from said first and second mounting members and said lubrication conduits are routed through their respective said mounting members in such a manner that said first and second superchargers are mounted on said engine assembly in substantially mirror image orientations thereabout.

3. An arrangement according to claim 2, wherein said mounting members are disposed on opposite sides of a crankcase of said engine assembly and said lubrication conduits connect said superchargers to an engine lubrication circuit through the sides of said crankcase.

4. An arrangement according to claim 2, wherein said lubrication conduits each comprise a lubricant feed passage and a lubricant return passage and the routing of at least part of said feed and return passages is inverted between said mounting members.

5. An arrangement according to claim 4, wherein inversion of said feed and return passages takes operative effect at respective supercharger mounting faces of said first and second supercharger mounting members.

6. An arrangement according to claim 2, wherein, when said superchargers are mounted on said engine assembly, at least one of corresponding pairs of charge air entries, charge air exits, exhaust gas entries or exhaust gas exits of said superchargers are disposed at substantially the same orientation as each other with respect to said engine assembly.

7. An arrangement according to claim 2, wherein at least one said individual mounting member comprises a component that is separable from both its associated said supercharger and from the rest of said engine assembly.

8. An engine assembly including first and second superchargers mounted thereto on individual first and second supercharger mounting members respectively, each said mounting member having integrated therewith a lubrication feed passage and a lubrication return passage, wherein said superchargers are separable from their associated said mounting members and the routing of said feed and return passages is substantially inverted between said mounting members in the region of respective supercharger mounting faces thereof in such a manner that said superchargers are mountable interchangeably between said first and second mounting members with substantially mirror image orientations and regardless of which said supercharger is mounted to which said mounting member.

9. An engine assembly according to claim 8, wherein said engine assembly comprises a multi-bank engine having a crankcase and defining a plurality of cylinders that are disposed in banks at an angle with respect to each other, said first and second mounting members being disposed on opposite sides of said crankcase and said first and second superchargers being associated with different said banks of said engine assembly.

10. A set of supercharger mounting members for use in a supercharger arrangement of an engine assembly, said mounting members comprising individual components and each individual said supercharger mounting member defining therethrough a supercharger lubrication feed passage and a supercharger lubrication return passage and end portions of said feed and return passages being substantially inverted between a pair of mounting members in the region of supercharger mounting faces thereof, whereby said mounting members are mountable separately to substantially opposing sides of a said engine assembly so that substantially identical superchargers are mountable one each to said mounting faces and are thereby disposed in substantially mirror image orientations about said engine assembly.

* * * * *